United States Patent [19]

Goesse et al.

[11] Patent Number: 4,895,406

[45] Date of Patent: Jan. 23, 1990

[54] BUMPER ARRANGEMENT WITH AN ADJUSTABLE COVERING FOR MOTOR VEHICLES

[75] Inventors: August-Wilhelm Goesse, Moensheim; Herbert Boegge, Schwieberdingen; Ulrich Kosmann, Liebenzell-Monakam, all of Fed. Rep. of Germany

[73] Assignee: Dr. Ing. h.c.F. Porsche AG, Weissach, Fed. Rep. of Germany

[21] Appl. No.: 309,144

[22] Filed: Feb. 13, 1989

[30] Foreign Application Priority Data

Feb. 12, 1988 [DE] Fed. Rep. of Germany ....... 3803386

[51] Int. Cl.$^4$ ............................................. B60R 19/00
[52] U.S. Cl. .................................... 293/102; 293/132; 296/195
[58] Field of Search ............... 293/102, 120, 132, 134, 293/135, 136, 137; 296/195

[56] References Cited

U.S. PATENT DOCUMENTS

| 4,251,103 | 2/1981 | Nakajima et al. | 293/102 |
| 4,274,667 | 6/1981 | Dietmar | 293/102 |
| 4,661,030 | 4/1987 | Delmastro | 411/116 |
| 4,811,979 | 3/1989 | Peter et al. | 293/102 |

FOREIGN PATENT DOCUMENTS

| 0057155 | 4/1982 | European Pat. Off. |
| 2747224 | 4/1979 | Fed. Rep. of Germany |
| 2756537 | 6/1979 | Fed. Rep. of Germany |

Primary Examiner—Robert R. Song

[57] ABSTRACT

A bumper arrangement for motor vehicles consists of a deformation-resistant support, which extends transversely with respect to the longitudinal direction of the vehicle and is supported with respect to the vehicle. A covering covers the support and has an edge portion with a deformation-resistant strip which is fastened at an adjacent body portion of the motor vehicle. The covering can be adjusted with respect to the adjacent body portion to be flush with the shell of the body portion by locally arranged clamping elements braced against a recess-shaped area of the body. The clamping elements are prepositioned and held at the body by screwable fastening members which interact with spreading members and which are operated from an interior space of the vehicle.

20 Claims, 3 Drawing Sheets

BUMPER ARRANGEMENT WITH AN ADJUSTABLE COVERING FOR MOTOR VEHICLES

BACKGROUND AND SUMMARY OF THE INVENTION

The invention relates to a bumper arrangement for motor vehicles comprising a deformation-resistant support which: extends transversely with respect to the longitudinal direction of the vehicle, is supported with respect to the vehicle, and which has a covering thereover. An edge portion of the covering is provided with a deformation-resistant strip and is fastened at the adjacent body of the motor vehicle.

A known bumper arrangement of this type is shown in German Unexamined Patent No. DE-OS 27 47 224, and has an edge portion of the covering provided with a deformation-resistant strip, through which screwable fastening elements are guided. This construction results in a good fastening of the edge portion to the body. It has the disadvantage that there is no provision for the adjustability of the covering with respect to the adjacent body.

It is the object of the invention to provide a fastening for an edge portion of an elastic covering with good support and wherein the tolerances of the covering, which are the result of manufacturing and assembly, can be compensated so that the covering is always arranged in the correct position with respect to the adjacent body.

According to the invention, this object is achieved by having the edge portion of the covering braced against a recess-shaped area of the body by means of locally arranged clamping elements, which are prepositioned at the body and are held in their positions by screwable fastening elements interacting with spreading elements which can be operated from an interior space of the vehicle.

It is further advantageous to have the recess-shaped area used for the fastening of the edge portion of the covering to have an approximately horizontally extending wall portion, an approximately vertically aligned wall portion and a connecting, diagonally extending corner area. The angularly shaped clamping element is provided with two differently aligned contact surfaces and a supporting surface. The edge portion of the covering is braced between this supporting surface and the horizontal wall portion.

It is further advantageous if the supporting surface is provided with a groove-shaped profiling at the side facing the strip and both the contact surfaces and the supporting surface are provided at self-supporting arms of the clamping element which is formed by an extruded profile. An arm of the clamping element forming the supporting surface is movable against the edge portion of the covering by the spreading element, which is in operative connection with the fastening element.

A further advantage is obtained if a protuberant positioning pin is arranged at the first contact surface of the clamping element for securing the clamping element through an opening of the vertical wall portion.

An extremely efficient clamping arrangement is provided by the wedge-shaped spreading element being inserted into a recess of the clamping element from the side and secured against falling-out in the direction of the fastening element. At both sides of the spreading element which face the recess, protuberant groove-shaped molded-out pieces are provided which engage in trough-shaped grooves of the recess to make secure the connection of the spreading element and clamping element. Movement of the spreading element in the direction of a second contact surface is limited by a stop in the recess.

A second contact surface of the clamping element is provided with a predetermined bending point defined by the recess and an opposite transverse groove. The fastening element is accommodated in the spreading element with respect to torsion, and the free end of the fastening element extends through the diagonally extending corner area of the recess-shaped area into the interior of the vehicle wherein a nut is placed onto its free end for bracing the clamping element.

The main advantages achieved by means of the invention are that, as a result of the clamping elements, which can be operated from an interior space of the vehicle, a continuous adjustability of the covering is provided so that a flush surface transition from the covering to the adjacent body is always ensured. Manufacturing costs are reduced by constructing the clamping element as an extruded profile.

Other objects, advantages and novel features of the present invention will become apparent from the following detailed description of the invention when considered in conjunction with the accompanying drawings.

DETAILED DESCRIPTION OF THE DRAWINGS

Figure 1:
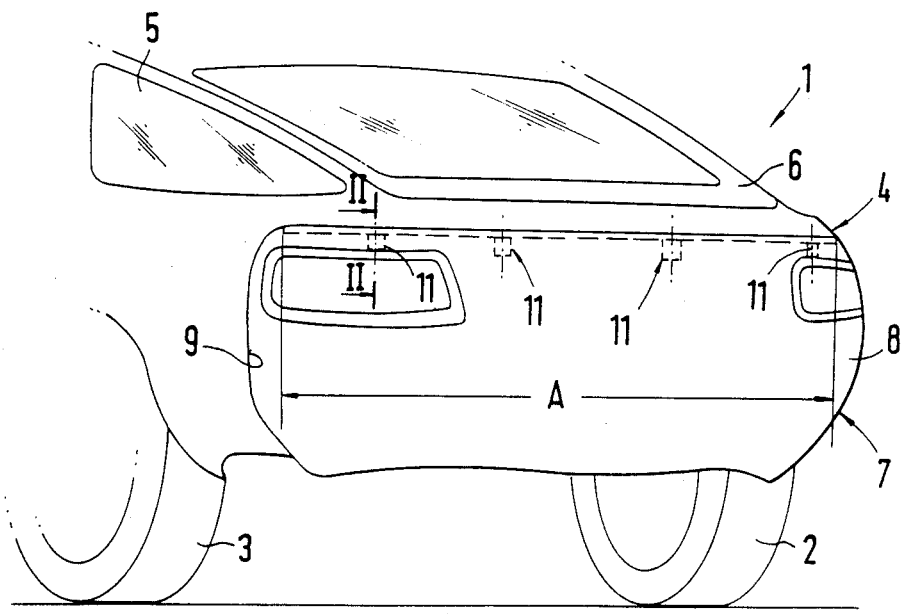
FIG. 1 is an oblique view of a rear area of a motor vehicle having a bumper arrangement according to the invention.

Shown in FIG. 1 is a motor vehicle 1 having wheels 2 and 3 and a body 4 with side windows 5 as well as a tail gate 6. The body 4 is equipped with a bumper arrangement 7, which is formed by a covering 8 and a deformation-resistant support (not shown in detail), and arranged behind this covering. This support carries the covering and supports itself at hydraulic shock absorbers, which are also not shown. The covering 8 consists of an elastic material, such as polyurethane, and yields under an impact occurring, for example, at a speed of the vehicle that is twice the normal walking speed of a pedestrian, and the covering subsequently automatically returns to its original shape.

Figure 2:
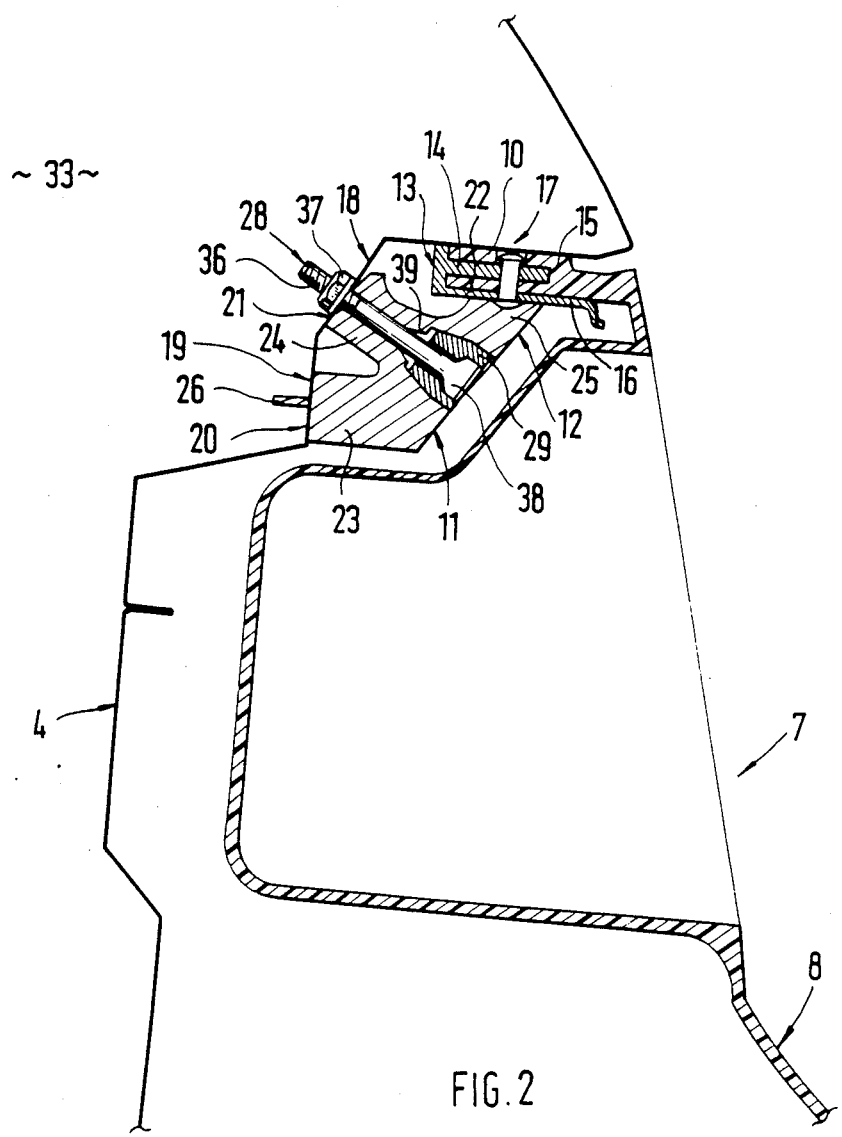
FIG. 2 is an enlarged sectional view according to Line II—II of FIG. 1.

The fastening of the covering 8 takes place along a separating line 9. For this purpose, the covering 8, at least in an upper area, has a horizontally aligned flange-type edge portion 10 (FIG. 2), which is braced against a recess-shaped area 12 of the body 4 by locally arranged clamping elements 11. The edge portion 10 is provided with a deformation-resistant strip 13 (FIG. 2) at least over a partial area A (FIG. 1) of the separating line 9. The strip 13 is made from any of aluminum, steel or another material having a high modulus of elasticity and has a profiled shape.

A first web 14 of the strip 13 projects into a recess 15 of the edge portion 10, whereas a second web 16, which extends in parallel to the first web 14, rests against the underside of the edge portion 10. The strip 13 is connected with the edge portion 10 by means of gluing and/or riveting. The recess-shaped area 12 consists of an approximately horizontally extending wall portion 17, a connecting, diagonally extending corner area 18 and an approximately vertically aligned wall portion 19.

Each angularly constructed clamping element 11 has two differently aligned contact surfaces 20, 21 and a supporting surface 22. The contact surfaces 20, 21 and the supporting surface 22 being provided at three differently sloped arms 23, 24, 25 of the clamping element 11. The free ends of the arms 23, 24, 25 are directed toward the recess-shaped area 12.

The first contact surface 20 arranged at the lower arm 23 is aligned approximately vertically and supports itself at the vertical wall portion 19, which extends in parallel to it. For fastening of the clamping element 11, a protuberant positioning pin 26 is mounted on the first contact surface 20 and is guided through an opening of the vertical wall portion 19, which is not shown in detail. The second contact surface 21 is provided at the central arm 24 of the clamping element 11 and supports itself at the diagonally extending corner area 18. The supporting surface 22 is formed by the top side of the third arm 25 and may be provided with a groove-shaped profiling or the like, so that a good hold is achieved between the supporting surface 22 and the strip 13 when the covering 8 is fastened. The clamping element 11 is preferably formed by an extruded profile.

Figure 3:
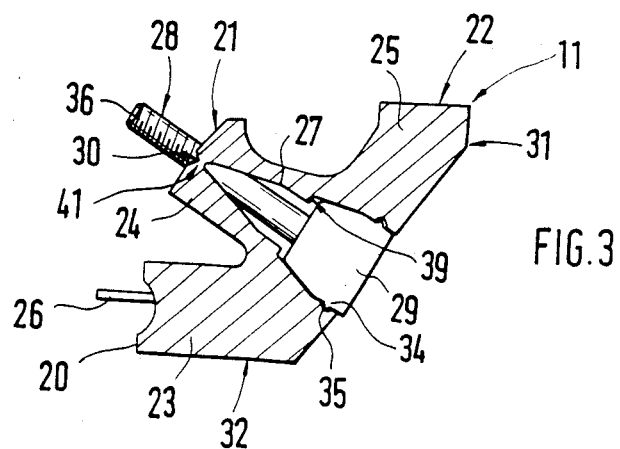
FIG. 3 is a lateral view of a first embodiment of a clamping element according to the invention.

A continuous adjustment of the supporting surface 22 is achieved in that, at the clamping element 11 in the area of the central arm 24, a recess 27 (FIG. 3) is provided, which is constructed to be open on the side facing away from the recess-shaped area 12. A spreading element 29 which interacts with a fastening element 28 is inserted into the recess 27. According to a first embodiment, the three arms 23, 24 and 25 are provided as a one-piece component, the approximately triangularly profiled recess 27 reaching approximately to the second contact surface 21. The bottom of the recess 27 and a horizontal transverse slot 30 arranged on the opposite side are arranged such that the clamping element 11 has a predetermined bending point 41 which divides it into an upper half 31 and into a lower half 32. By the tightening of the fastening element 28, the wedge-shaped spreading element 29 is moved in the direction of the interior space 33 of the vehicle (trunk), so that the upper half 31 of the clamping element 11 and supporting surface 22 are pressed upwards against the edge portion 10 of the covering 3. The wedge-shaped spreading element 29 is pushed into the recess 27 from the side, and in the mounted condition B, is secured against falling-out in the longitudinal direction. This securing is achieved because, at the two sides of the spreading element 29 facing the recess 27, a groove-shaped molded-on piece 34 is provided which engages in a trough-shaped groove 35 of the recess 27.

The fastening element 28, which is formed by a screw 36 and a nut 37 (FIG. 2), is aligned approximately vertically to the diagonally extending corner area 18, similarly the second arm 34 of the clamping element 11. The screw 36 is guided through an opening of the spreading element 29, the recess 27, the central arm 24 and the diagonally extending corner area 18 and projects beyond the latter. The nut 37 is screwed onto the projecting free end of the screw 36 from the direction of the interior 33 of the vehicle. The head 38 of the screw 37 is protected against torsion and is encased in the spreading element 39. The screw 37 and the spreading element 29 may be constructed to be either in one or in two parts.

The axial movement of the spreading element 29, in the direction of the interior 33 of the vehicle, is limited by a step-shaped stop 39, which is provided at the recess 27.

Figure 4:
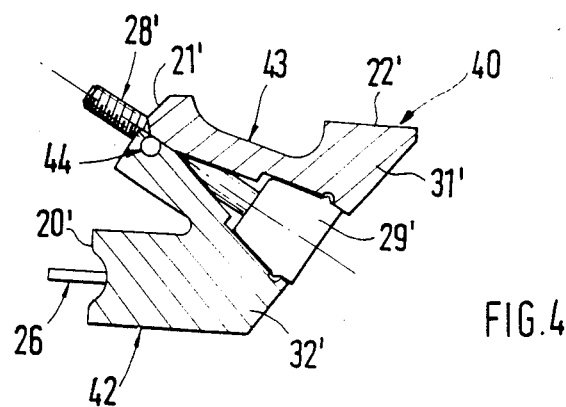
FIG. 4 is a lateral view of a second embodiment of the clamping element.

FIG. 4 shows a second embodiment of a clamping element 40. This clamping element 40 consists of two parts 42, 43, which are hinged to one another. In this case, the spreading element 29', the fastening element 28' and the individual contact and supporting surfaces 20', 21', 22' are constructed to be identical to those of clamping element 11. Instead of utilizing the predetermined bending point 41 of FIG. 3, the upper part 31' is hinged to the lower part 32' at 44. For this purpose, a cylindrical portion of the upper part 31' reaches into a corresponding receiving area of part 32'. The positioning at the body 4, in the case of clamping element 40, takes place in the same manner as in the case of clamping element 11.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A bumper arrangement for motor vehicles having an adjustable covering;
   a deformation-resistant support which extends transversely with respect to the longitudinal direction of the vehicle and is supported with respect to the vehicle;
   a covering means which covers the deformation-resistant support;
   an edge portion of the covering means being provided with a deformation-resistant strip which is fastened at an adjacent body portion of the motor vehicle;
   the improvement comprising: that the edge portion of the covering means is braced against a recess-shaped area of the adjacent body portion by locally arranged clamping element means;
   the clamping element means being prepositioned at the adjacent body and held in position by operatable screwable fastening elements; and
   the fastening elements interacting with spreading element means, operated from an interior space of the vehicle, to cause the spreading element means to apply a force to the clamping element means to cause the clamping element means to brace the edge portion of the covering means against the recessed-shaped area of the adjacent body portion.

2. A bumper arrangement according to claim 1, wherein the recess-shaped area for the fastening of the edge portion of the covering means comprises an approximately horizontally extending wall portion, an approximately vertically aligned wall portion, and a connecting, diagonally extending corner area.

3. A bumper arrangement according to claim 1, wherein the clamping element means is angularly shaped and has two differently aligned contact surfaces and a supporting surface, and wherein the edge portion of the covering means is braced between the supporting surface and a horizontal wall portion of the body portion.

4. A bumper arrangement according to claim 2, wherein the clamping element means is angularly shaped and has two differently aligned contact surfaces and a supporting surface, and wherein the edge portion of the covering means is braced between the supporting surface and the horizontal wall portion.

5. A bumper arrangement according to claim 3, wherein the supporting surface is provided with a groove-shaped profiling at a side facing the deformation-resistant strip.

6. A bumper arrangement according to claim 4, wherein the support surface is provided with a groove-shaped profiling at a side facing the deformation-resistant strip.

7. A bumper arrangement according to claim 3, wherein the contact surfaces and the supporting surface are provided as self-supporting arms of the clamping element means.

8. A bumper arrangement according to claim 4, wherein the contact surfaces and the supporting surface are provided as self-supporting arms of the clamping element means.

9. A bumper arrangement according to claim 1, wherein the clamping element means is formed by an extruded profile.

10. A bumper arrangement according to claim 7, wherein the arm of the clamping element means forming the supporting surface can be moved upward against the edge portion of the covering means by the spreading element means that interacts with the fastening element.

11. A bumper arrangement according to claim 8, wherein the arm of the clamping element means forming the supporting surface can be moved upward against the edge portion of the covering means by the spreading element means that interacts with the fastening element.

12. A bumper arrangement according to claim 3, wherein a protuberant positioning pin is arranged on one of the two contact surfaces of the clamping element means, and wherein the positioning pin is guided through an opening of the vertical wall portion.

13. A bumper arrangement according to claim 10, wherein the spreading element means is wedge-shaped and is inserted into a recess of the clamping element means.

14. A bumper arrangement according to claim 11, wherein the spreading element means is wedge-shaped and is inserted into a recess of the clamping element means.

15. A bumper arrangement according to claim 13, wherein the spreading element means can be inserted into the recess from the side and is secured against falling-out in the direction of the fastening element.

16. A bumper arrangement according to claim 13, wherein the spreading element means faces the recess at two sides, each of which has a groove-shaped molded-out piece which engage in trough-shaped groves of the recess.

17. A bumper arrangement according to claim 14, wherein the spreading element means faces the recess at two sides, each of which has a groove-shaped molded-out piece which engage in trough-shaped groves of the recess.

18. A bumper arrangement according to claim 13, wherein a stop is provided in the recess to limit the movement of a contact surface of the clamping element means upward against the edge portion.

19. A bumper arrangement according to claim 3, wherein one of the contact surfaces of the clamping element means is provided with a predetermined bending point which is defined by a recess and an opposite transverse groove.

20. A bumper arrangement according to claim 11, wherein a head of the fastening element is accommodated in the spreading element means and is secured with respect to torsion, and wherein a free end of the fastening element extends through the diagonally extending corner area of the recess-shaped area into the interior of the vehicle; and wherein a nut is placed onto the free end of the fastening element for bracing of clamping element means.

* * * * *